Feb. 6, 1962   R. L. CRAIGLOW   3,020,421
CRYSTAL SWITCHING SYSTEM
Filed Sept. 8, 1959   2 Sheets-Sheet 2

INVENTOR.
ROBERT L. CRAIGLOW
BY Moody and Phillips
ATTORNEYS

United States Patent Office 3,020,421
Patented Feb. 6, 1962

3,020,421
CRYSTAL SWITCHING SYSTEM
Robert L. Craiglow, Cedar Rapids, Iowa, assignor to Collins Radio Company, Cedar Rapids, Iowa, a corporation of Iowa
Filed Sept. 8, 1959, Ser. No. 838,481
6 Claims. (Cl. 307—88.5)

This invention relates generally to crystal selection means and more particularly to a circuit means for selecting one of a group of crystals by diode switching means and utilizing a lesser number of control leads than has heretofore been employed.

There are many known circuits employing diodes to switch various ones of a group of crystals into a given application. For example, a plurality of diodes may have one of their electrodes connected to a common terminal and the other electrode connected to a crystal individual thereto. By selectively biasing the diodes it is possible to cause all but a selected one thereof to become nonconductive so that only the crystal associated with the conductive diode will be actively connected to the common terminal and so be utilized in some desired manner. Such a structure, however, requires an individual control lead for each diode in order to perform the biasing function. A further characteristic of such an arrangement, which is also true of other similar prior art arrangements, is that the crystals not employed can nevertheless become active in the circuit. Such activity occurs by reason of the fact that ordinarily a certain amount of stray capacitance exists between the terminal lead of the crystal and other parts of the circuit, such as, for example, the metal parts near (and connected to) the terminals of the crystal actually selected. In certain applications where the frequency of the nonselected crystals are quite close together the aforementioned stray capacitors will combine with the reactance of the crystal to produce a resultant reactance which will alter the reactance presented to the selected crystal. In most applications circuits are designed to present an impedance consisting of about 32 microfarads to a crystal. If such impedance is altered it could result in a change in operating frequency of the selected crystal. Consequently, it would be desirable to provide means for insuring that the nonselected crystals could not function to change the reactance presented by the general circuit to the selected crystal.

An object of the present invention is to provide switching means for selectively switching one of a plurality of crystals into a circuit and simultaneously insuring that the remaining crystals do not function to produce deleterious effects upon the operation of the selected crystal.

A further aim of the invention is to provide a circuit for selectively switching one of a plurality of crystals across a pair of terminals in which the number of control leads required to perform such selection is one-half the number of selectable crystals.

Further objects of the invention are to provide a system for selectively connecting any one of a plurality of crystals across a given pair of terminals, which system is smaller and less expensive than switching systems known heretofore.

A fourth object of the invention is the improvement of crystal switching circuits generally.

In accordance with the invention there is provided a pair of D.-C. grounded conductors across which the selected crystal is to be connected, and a plurality of pairs of switching circuits connected in parallel across said pair of conductors. Each of said switching circuits is comprised of a first diode, capacitor means, and a crystal connected in series arrangement in the order recited, with all of the crystals being connected to the same conductor of said pair of conductors and a terminal of said first diodes being connected to the other conductor of said pair of conductors. An individual second diode is connected across each of said crystals. The first diodes function, when nonconductive, to isolate the associated crystal from the said pair of conductors. The second diodes function, when conductive, to short-circuit the associated crystal upon itself.

In each pair of switching circuits there is provided means for biasing said first diodes to a nonconductive state and said second diodes to a conductive state when neither of the associated crystals has been selected. Such biasing means comprises a first battery source having a potential negative with respect to ground potential, a second battery source having a potential positive with respect to ground potential, a first voltage divider connected between said first and second battery sources and having points thereon connected respectively to the junctions between the first diode and the capacitor of each of the switching circuits of said pair of switching circuits so that said first diodes are biased normally (i.e. in the absence of control switching voltages described later herein) to a cut-off condition. Said biasing means also comprises a second voltage divider means connected between said first and second battery source and having points thereon connected to the junctions between said capacitor and said second diode of each switching circuit of said pair of switching circuits so that said second diodes are biased normally into a conductive state to short-circuit the crystal.

If the portions of the two voltage dividers mentioned above are correctly proportioned, there will be a point on each thereof between their junctions with the two switching circuits, at which the potential will be, in the absence of a switching control voltage, substantially the same as the potential of said pair of conductors, which are at ground potential. Means are provided to supply to these last mentioned points on said voltage dividers a switching voltage more negative than said first battery source or a switching voltage more positive than said second battery source; which switching voltages will function to change the conductivity of said diodes in one or other of said two switching circuits to select one of the two crystals contained in said series circuits. More specifically, the switching voltage will function to cause the first diode in one of said switching circuits to become conductive and will cause the second diode in said same switching circuit to be nonconductive, thus eliminating the short-circuit across the crystal while at the same time removing the open circuit created by said first diode being in a nonconductive state. Since the capacitor in the series circuit is comparatively large, the crystal selected is, in essence, connected directly across said pair of conductors.

From the detailed description contained later herein it will be seen that several pairs of the switching circuits described above can be connected in parallel with respect to each other across said pair of conductors and that the first and second battery means mentioned hereinbefore can be employed with each of said pairs of switching circuits. A suitable means such as a wafer switch can be employed to apply selectively either ground potential, a positive switching voltage or a minus switching voltage to each of the switching control leads connected with each of the pairs of series circuits.

In accordance with another form of the invention the first diode of one of said switching circuits in any given pair of switching circuits can be connected to the same terminal of said pair of terminals as the second diode of the other switching circuit of said any given pair of switching circuits. In essence, the foregoing sentence states that in any given pair of switching circuits the connections of the individual switching circuits with the pair of terminals can be interchanged without altering the electrical characteristics of the system. This is true because the potential of both terminals of said pair of terminals is D.-C. ground potential.

An important feature of the invention, it is to be noted specifically, is that for each pair of switching circuits there is but a single switching control lead which can be used to transmit selectively either a positive or a minus switching voltage to select either one of the two crystals contained in the pair of switching circuits.

A further important feature of the invention is that each nonselected crystal is short-circuited upon itself by one of the second diodes mentioned above, thus effectively preventing said nonselected crystal from interfering with the operation of the selected crystal by virtue of stray capacitance that might exist.

The above-mentioned and other objects and features of the invention will be understood more fully from the following detailed description thereof when read in conjunction with the drawings in which.

Figure 1:
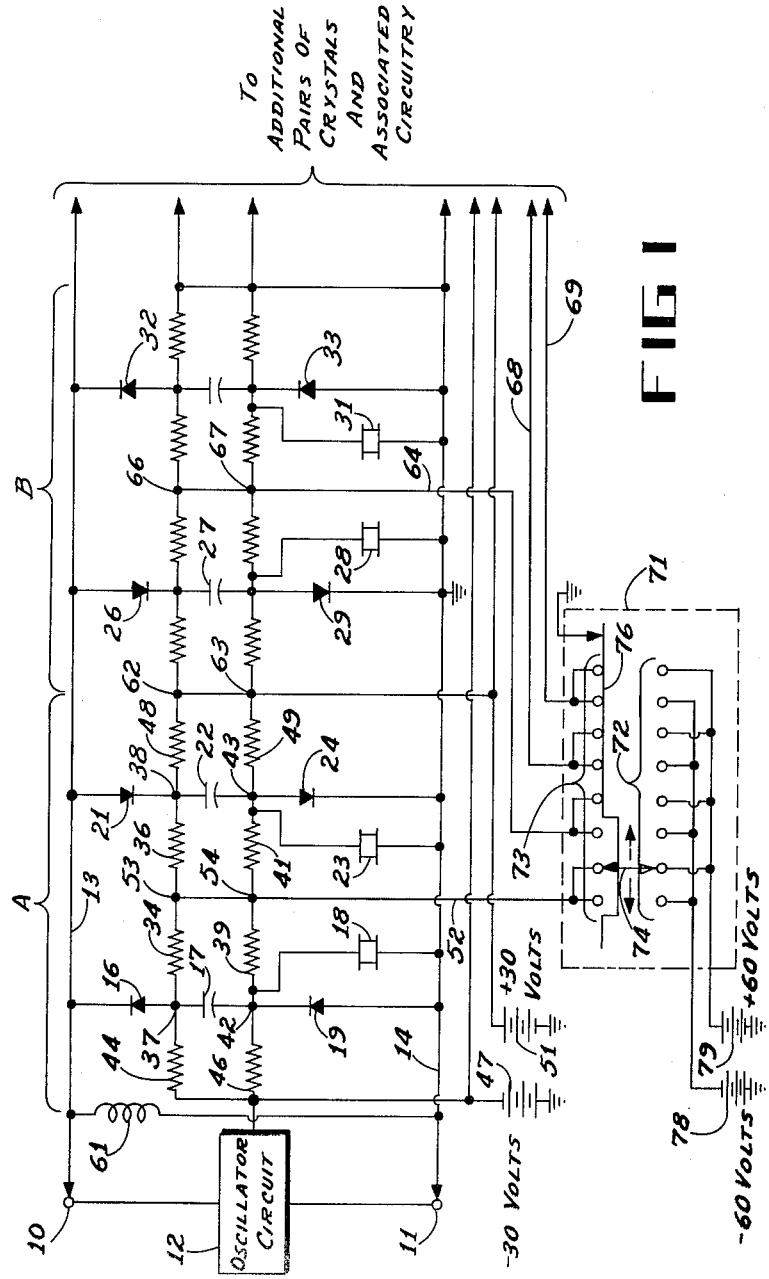
FIG. 1 shows a schematic sketch of one form of the invention.

As indicated hereinbefore a principal function of the invention is to connect selectively one of a plurality of crystals to a given pair of terminals such as terminals 10 and 11 which also may be connected to an oscillatory circuit, the frequency of which the selected crystal is to control. Extending from the terminals 10 and 11 are conductors 13 and 14 respectively. Across the conductors 13 and 14 is a plurality of switching circuits each comprising a diode, a capacitor, and a crystal connected in series arrangement, with a second diode connected across the crystal. More specifically, one of such switching circuits is comprised of diode 16, capacitor 17, crystal 18 and diode 19. Another such switching circuit is comprised of diode 21, capacitor 22, crystal 23, and diode 24. A third such circuit is comprised of diode 26, capacitor 27, crystal 28, and diode 29. It will be observed that the two diodes in each such circuit are oppositely poled with respect to D.-C. ground. For example, diode 16 has its cathode connected to conductor 13 which is at D.-C. ground potential, and diode 19 has its anode connected to conductor 14, which also is at D.-C. ground potential. As will be seen later these diodes (such as diodes 16 and 19) function to perform the actual switching of a selected crystal across the terminals 10 and 11, in response to an applied switching control voltage, also described later herein.

Considering the circuit of FIG. 1 generally, the switching circuits act in pairs. For example, crystals 18 and 23 and their associated circuitry have a common switching control conductor 52 and will respond to a switching control signal (mentioned in the previous paragraph) impressed thereon to connect either crystal 18 or crystal 23 across the conductors 13 and 14. Similarly, crystals 28 and 31 act together. Other pairs of crystals with similar circuitry may be connected across the conductors 13 and 14. The detailed method or manner of connecting such additional circuitry will become more apparent later herein.

It will be observed that in any given pair of switching circuits (such as under the bracket A) the diodes of one of the switching circuits (such as diodes 16 and 19) will be oppositely poled with respect to the diodes of the other switching circuit (such as diodes 21 and 24). Similarly diodes 26 and 29 are oppositely poled with respect to diodes 32 and 33. However, the diodes of adjacent switching circuits of adjacent pairs of switching circuits are poled in the same polarity. For example, diodes 21 and 24 of pair A are poled in the same direction as diodes 26 and 29 of pair B. Similarly, diodes 32 and 33 would be poled in the same polarity as the diodes of an adjacent switching circuit if another pair of switching circuits were to be added in FIG. 1 on the right side of pair B.

It will be noted that the structure and operation of switching circuit pair A is the same as that for switching circuit pair B. Consequently, only the structure and operation of the switching circuit pair A will be discussed in detail. Such a discussion is contained in the immediately following paragraphs.

A pair of resistors 34 and 36 connect the junction 37 to the junction 38. Another pair of resistors 39 and 41 connect the junction 42 to the junction 43. Resistors 44 and 46 connect negative voltage source 47 to the junctions 37 and 42 respectively. Resistors 48 and 49 connect the positive battery source 51 to junctions 38 and 43 respectively. Switching control conductor 52 is connected to junctions 53 and 54.

The over-all purpose of the resistive elements and the battery sources cited in the previous paragraph is to provide biasing voltages across the diodes 16, 19, 21, and 24 so that in the absence of a switching signal applied to conductor 52 the diodes 16 and 21 will be in a nonconductive state and the diodes 19 and 24 will be in a conductive state. It can be seen that if both of the diodes 16 and 21 are nonconductive, the crystals 18 and 23 are effectively blocked from participating in any circuit connected across terminals 10 and 11. Further, if diodes 19 and 24 are both conductive, the crystals 18 and 23 are short-circuited upon themselves and are prevented from producing spurious signals or impedances in the oscillator circuit 12 because of reasons indicated hereinbefore.

At this point specific values will be applied to the circuit to show why diodes 16 and 21 are nonconductive and why diodes 19 and 24 are conductive in the absence of a switching signal applied to the conductor 52. Thereafter, it will be shown why a positive switching signal applied to conductor 52 will cause diode 16 to become conductive and diode 19 to become nonconductive to effectively connect crystal 18 across terminals 10 and 11 while producing no change in the status of diodes 21 or 24. Subsequently, it will be shown why the application of a negative switching signal to conductor 52 will cause diode 21 to become conductive and diode 24 to become nonconductive so as to effectively connect crystal 23 across terminals 10 and 11 while producing no change in the status of diodes 16 or 19. It should be noted that application of switching signals to control lead 52 will function to produce changes only in the diodes of switching circuits A and will not affect the switching circuits B or any other switching circuits.

Assume that battery source 47 has a value of a minus 30 volts and that battery source 51 has a value of a plus 30 volts and that resistors 44, 46, 34, 39, 36, 41, 48, and 49 all have equal values. Assume further that the D.-C. potential on control conductor 52 and on conductors 13 and 14 is ground potential (even though in FIG. 1 conductor 52 is shown connected to a plus 60 volts). Consequently the potential appearing at junction 42 would tend to be a minus 15 volts (which is the midpoint between ground and minus 30 volts). However, due to the fact that conductor 52 is at D.-C. ground potential, the diode 19 will conduct to raise the potential of the point 42 to about a minus one volt, depending upon the specific characteristics of the diode 19. The potential of the junction 37 will be about a minus 15 volts, thus insuring that diode 16 remains in a nonconductive condition (conductor 13 is at a D.-C. ground potential through R.-F. choke 61). Capacitor 17 functions as a D.-C. block between junctions 42 and 37 so that junction 37 may remain at a minus 15 volt level while junction 42 is at about a minus one volt level. It can be seen that under these circumstances the crystal 18 is removed effectively from the oscillator circuit 12.

With respect to the other switching circuit under the bracket A the potential at junction 43 tends to be a positive 15 volts (which is the midpoint between ground potential and positive 30 volts). However, since the diode 24 is conductive under these circumstances the potential of the junction 43 will decrease to about a plus one volt level, the exact value depending on the specific characteristics of the diode 24. The junction 38 is at a potential of positive 15 volts, thus causing diode 21 to be nonconductive. Capacitor 22 functions as a D.-C. block between junctions 38 and 43 to permit the potential of junction 38 to remain at a positive 15 volt level while the potential of junction 43 is about at a one plus volt level. It can be seen, therefore, that crystal 23 is effectively isolated from the oscillator circuit 12.

Assume now that a positive 60 volt signal is supplied to the terminals 53 and 54 through switching control conductor 52. The potential of junction 43 will tend to rise a positive 45 volts, which is the midpoint between a positive 30 volts supplied from battery 51 and the positive 60 volts supplied to terminal 54. However, due to the conductive state of diode 24 the actual potential of junction 43 will remain in the neighborhood of a plus one volt. The potential of junction 38 will increase, however, to a positive 45 volts which will further insure that the diode 21 remains in a nonconductive state. Thus the crystal 23 still remains isolated from the oscillator circuit 12.

The situation is different, however, with respect to crystal 18, as will now be described. The potential of point 42 increases to a positive 15 volts which is the midpoint between the minus 30 volts supplied from the battery source 47 and the positive 60 volts supplied over control lead 52. The diode 19 is thereby caused to become nonconductive. The potential of the junction 37 also increases towards a positive 15 volts to cause the diode 16 to become conductive. Actually the potential of junction 37 only increases to about a plus one volt due to the conductivity of diode 16. Under these circumstances, with diode 19 nonconductive and diode 16 conductive, the crystal 18 is connected, in effect, directly across the terminals 10 and 11 since the capacitor 17 is almost a short circuit at the oscillating frequency. Moreover, the other crystals, including crystal 23, can cause no disturbances in the circuit inasmuch as each is short-circuited upon itself through conductive diode 24.

Assume now that a control signal of a minus 60 volts is supplied to the junctions 53 and 54 through control conductor 52. Under such circumstances the potential of the junction 42 will tend to be a minus 45 volts. However, due to the conductivity of diode 19, the actual potential of the potential 42 will be about a minus one volt. The potential of the junction 37 will be a minus 45 volts, which will further insure the non-conductivity of the diode 16. Thus the crystal 18 is isolated quite effectively from the oscillator circuit 12. The potential of the junction 43 will now be at a level of minus 15 volts, thus causing the diode 24 to be nonconductive. The potential of the junction 38 will also tend to be at a minus 15 volts. However, due to the conductivity of diode 21, the actual potential of the junction 38 will be about a minus one volt. It can be seen that the crystal 23 will, under such circumstances, be connected directly across the terminals 10 and 11. Crystal 18 can produce no effect upon the oscillator circuit 12 since it is short-circuited upon itself through the diode 19.

It will be observed that the switching control voltage supplied to control conductor 52 can have no effect upon the circuitry under the bracket B inasmuch as the application of a plus 30 volts from battery source 51 to junctions 62 and 63 completely isolates the circuitry under bracket B from any change in voltage at the terminals 53 and 54. Actually, the circuitry under bracket B has its own control conductor 64 by means of which either ground potential, a positive 60 volt signal, or a negative 60 volt signal can be supplied to the junctions 66 and 67.

Other control conductors 68 and 69 can be connected to switching circuits (not shown) similar to that under bracket A or bracket B.

It will be apparent that if it is desired to connect only one crystal across the terminals 10 and 11 a positive or a negative 60 volts signal must be supplied to only one of the control leads 52, 64, 68, or 69. The remainder of the control leads must be at ground potential. Obviously, if a 60 volt, either positive or negative, were supplied to two or more of the control conductors then two or more crystals would be connected to the oscillator circuit 12.

Within the dotted rectangle 71 there is shown, in schematic form, switching means which will function to supply selectively either a positive 60 volt signal or a negative 60 volt signal to any one of the control leads 52, 64, 68, or 69 and to supply ground potential to the other three of such control leads. More specifically, this is accomplished in the following manner. The structure within the dotted rectangle 71 may be a wafer-type switch having three levels consisting of two stationary levels and one rotatable level (the rotor). On one of the stationary levels there may be positioned a series of contacts 72 and on the other stationary level there can be provided a second circular row of contacts 73. The rotor may comprise contact means 74 which functions to connect an individual one of the fixed contacts 72 to a corresponding one of the fixed contacts 73. Further, the rotor may have provided thereon a strip conductor designated by the referenced character 76 which is formed so as to supply ground potential to all of the contacts 73 except at least two contacts thereof, said two contacts being connected to the same switching control conductor and further being connected to one of the contacts 72 through rotor arm 74. Due to the fact that it is necessary to be able to apply either a minus 60 volt signal or a positive 60 volt signal to any one of the control conductors 52, 64, 68, or 69 it is necessary that each control conductor be terminated in two terminals. One of these terminals corresponds to a contact of the group of contacts 72 which is connected to the 60 volt D.-C. battery source 78 and the other terminal corresponds to a contact of the group of contacts 72 which is connected to the positive 60 volt battery source 79. Thus as the rotor of the wafer switch is rotated, the contact 74 moves along connecting together corresponding contacts of the groups of contacts 72 and 73 and alternately placing a minus 60 volt signal and a positive 60 volt signal on consecutive ones of the control conductors 52, 64, 68, and 69. The element 76, which is connected to ground potential, moves coincidentally with the contact 74 since it is also mounted on the rotor.

Figure 2:
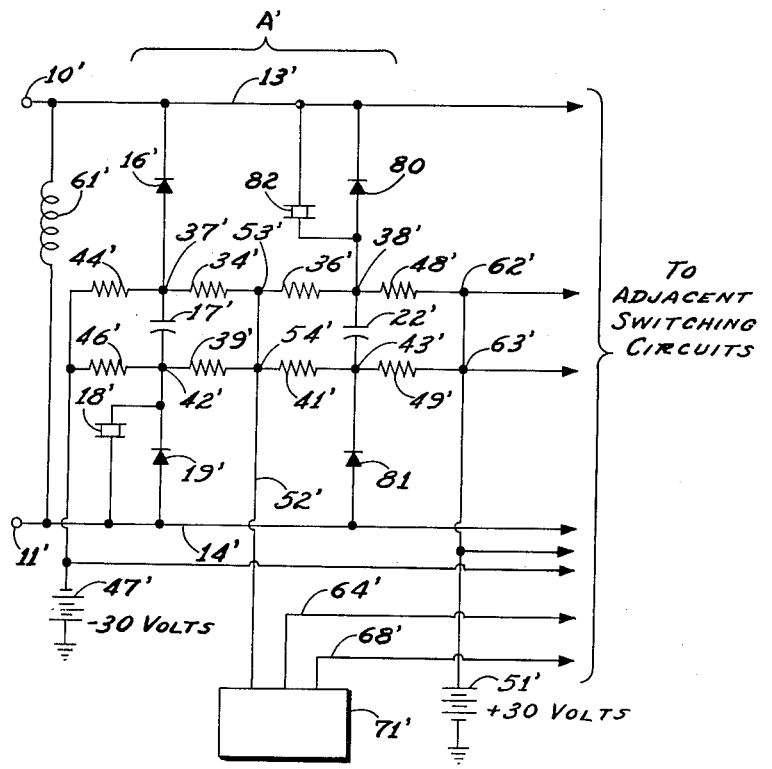
FIG. 2 shows a partial schematic sketch of another form of the invention.

Referring now to FIG. 2, there is shown an alternative form of the invention. An inspection of the circuit of FIG. 2 will reveal that it represents only a portion of that shown in FIG. 1. More specifically, only a single pair of switching circuits is shown in FIG. 2. For purposes of discussion assume that this pair of switching circuits would correspond to the pair of switching circuits under the bracket A of FIG. 1. All of the elements of FIG. 2 which have corresponding elements in the circuit of FIG. 1 have been identified by the same reference characters (primed). The only difference between the circuit of FIG. 2 and the corresponding portion of the circuit of FIG. 1 is that the diodes 80 and 81, which correspond in a general sense to the diodes 24 and 21 of FIG. 1, have had their polarities and their relative positions reversed. Also, the crystal 82 of FIG. 2, which corresponds generally to crystal 23 of FIG. 1, is connected across the upper diode 80 instead of the lower diode 81. This difference in structure is possible since both the conductors 13' and 14' are at D.-C. ground potential. Electrically speaking, the circuit of FIG. 2 is the same as the circuit of FIG. 1. The application of a positive 60 volt signal to the switching conductor 52' will function to make diode 19' nonconductive, and to make diode 16' conductive, while at the same time leaving the diode 81 in a nonconductive state and leaving diode 80 in a conductive state. Thus, the crystal 18' is effectively connected across the terminals 10' and 11' while crystal 82 is isolated therefrom. On the other hand, if a negative 60 volt signal is supplied to the switching control conductor 52', the diode 19' will be in a conductive state and the diode 16' will be in a nonconductive state, whereas, the diode 81 will be in a conductive state and diode 80 will be in a nonconductive state, thus effectively connecting the diode 82 across the conductors 13' and 14' and isolating crystal 18' from conductors 13' and 14'.

It is to be noted that the invention described herein is but a preferred embodiment thereof and that various changes may be made in circuit arrangement and type components employed without departing from the spirit or scope of the invention.

I claim:
1. A selecting circuit comprising a pair of terminals having a given D.-C. potential, and at least one pair of switching circuits connected in parallel with each other across said pair of terminals, each of said switching circuits comprising a first diode having an anode and a cathode and crystal means connected in series arrangement with respect to said pair of terminals, and a second diode connected across said crystal means, the anode of the first diodes of one of said switching circuits being connected to said crystal means connected in series therewith, the cathode of the first diode of the other of said switching circuits being connected to the said crystal means connected in series therewith, the first and second diode of any given switching circuit being oppositely poled with respect to said given D.-C. potential, biasing means for biasing said first diodes into a nonconductive state and said second diodes into a conductive state, said biasing means comprising first voltage source means negative with respect to the D.-C. potential of said pair of terminals, second voltage source means positive with respect to the D.-C. potential of said pair of terminals, and a resistive network connected between said first and second voltage source means and having points thereon connected to the point between said first diode and said second diode of each of said two switching circuit of a given pair of said switching circuits, and control conductor means connected to said resistive network between the points at which the resistive network is connected to said two switching circuits, and means for selectively supplying to said control conductor means either a positive voltage of sufficient magnitude to cause one of said first diodes to become conductive and one of said second diodes to become nonconductive, a negative voltage of sufficient magnitude to cause the other of said first diodes to become conductive and the other of said second diodes to become nonconductive, or the D.-C. potential of said pair of terminals.

2. A selecting circuit in accordance with claim 1 in which said switching circuits are connected across said pair of terminals with one terminal of each of said crystal means being connected to a first terminal of said pair of terminals.

3. A selecting circuit in accordance with claim 1 in which said switching circuits are connected across said pair of terminals with the said first diode of one of said switching circuits of any given pair of switching circuits and the said second diode of said other switching circuit of said any given pair of switching circuits connected to a given terminal of said pair of terminals.

4. A selecting circuit comprising a pair of terminals having a given D.-C. potential, and a plurality of pairs of switching circuits connected in parallel across said pair of terminals, each of said switching circuits comprising a first diode, capacitor means, and crystal means connected in series arrangement in the order recited across said pair of terminals, said first diode in one of said switching circuits of each pair of switching circuits being poled with its forward impedance presented to the associated crystal means through the capacitor connected therebetween, the diode of the other of said switching circuits of said pair of switching circuits being poled with its back impedance presented to the associated crystal means through the capacitor connected therebetween, a plurality of second diodes with a separate one thereof connected across each of said crystal means, the said first and second diodes of any given switching circuit being poled oppositely with respect to said given D.-C. potential, first biasing means constructed and arranged to bias said first diodes into a nonconductive state comprising first battery source means having a second potential more negative than said given D.-C. potential, second battery source means having a third potential more positive than said given D.-C. potential, and first voltage divider means connected between said first and second battery source means and having points thereon connected to the junctions between the said first diode and the said capacitor means of said two switching circuits of said pair of switching circuits, second biasing means constructed and arranged to bias said second diodes into a conductive state comprising second voltage divider means connected between said first and second battery source means and having points thereon connected to the junctions between said second diodes and said capacitor means of said two switching circuits of said pair of switching circuits, switching control conductor means connected to points on said first and second voltage divider between the points connected to said switching circuits, and means for selectively supplying to said control conductor either a positive control switching voltage of sufficient magnitude to cause one of said first diodes to become conductive and one of said second diodes to become nonconductive, a negative switching control voltage of sufficient magnitude to cause the other of said first diodes to become conductive and the other of said second diodes to become nonconductive, or said given D.-C. potential.

5. A selecting circuit in accordance with claim 4 in which said switching circuits are connected across said pair of terminals with one terminal of each of said crystals being connected to a first terminal of said pair of terminals.

6. A selecting circuit in accordance with claim 4 in which said switching circuits are connected across said pair of terminals with the said first diode of one of said switching circuits of any given pair of switching circuits and the said second diode of said other switching circuit of said any pair of switching circuits connected to a given terminal of said pair of terminals.

References Cited in the file of this patent

UNITED STATES PATENTS

| | | |
|---|---|---|
| 2,575,363 | Simons | Nov. 20, 1951 |
| 2,576,026 | Meacham | Nov. 20, 1951 |
| 2,594,449 | Kircher | Apr. 29, 1952 |
| 2,618,753 | Mierlo | Nov. 18, 1952 |
| 2,762,936 | Forrest | Sept. 11, 1956 |
| 2,782,307 | Von Sivers et al. | Feb. 19, 1957 |

FOREIGN PATENTS

| | | |
|---|---|---|
| 1,038,127 | Germany | Sept. 4, 1958 |